US008818178B1

(12) United States Patent
Bhogal et al.

(10) Patent No.: US 8,818,178 B1
(45) Date of Patent: Aug. 26, 2014

(54) DIGITAL VIDEO RECORDER CONFLICT HANDLING EMPLOYING REBROADCAST REQUESTS

(71) Applicant: International Business Machines Corporation, Armonk, NY (US)

(72) Inventors: Kulvir Singh Bhogal, Forth Worth, TX (US); Gregory Jensen Boss, Saginaw, MI (US); Rick A Hamilton, II, Charlottesville, VA (US); Brian Marshall O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/793,081

(22) Filed: Mar. 11, 2013

(51) Int. Cl.
*H04N 5/76* (2006.01)

(52) U.S. Cl.
USPC .......................................................... 386/292

(58) Field of Classification Search
CPC ........... H04N 5/00; H04N 7/00; H04N 21/00; H04N 21/4721; H04N 21/4583; H04N 21/4147; H04N 5/765
See application file for complete search history.

(56) References Cited

U.S. PATENT DOCUMENTS

| 7,369,750 | B2 | 5/2008 | Cheng |
| 7,574,231 | B2 | 8/2009 | Matsubara |
| 7,917,008 | B1 | 3/2011 | Lee |
| 8,185,899 | B2 | 5/2012 | Daly |
| 8,244,102 | B2 | 8/2012 | Bhogal |
| 8,356,323 | B2 * | 1/2013 | Chiang ........................... 725/80 |
| 2006/0127038 | A1 | 6/2006 | Kwon |
| 2006/0136966 | A1 * | 6/2006 | Folk, II ........................... 725/58 |
| 2008/0075423 | A1 | 3/2008 | DeBie |
| 2008/0273856 | A1 | 11/2008 | Bumgardner |
| 2009/0007184 | A1 | 1/2009 | Nakamura |
| 2009/0249409 | A1 | 10/2009 | Bhogal |
| 2010/0135639 | A1 * | 6/2010 | Ellis et al. ........................ 386/83 |
| 2010/0319042 | A1 | 12/2010 | Ryden |
| 2011/0194840 | A1 * | 8/2011 | Alexander ..................... 386/293 |
| 2012/0020650 | A1 * | 1/2012 | Subramanian et al. ........ 386/291 |
| 2012/0030721 | A1 * | 2/2012 | Smith et al. ..................... 725/88 |

OTHER PUBLICATIONS

Cisco—"Electronic Program Guide", Chapter 26—User Guide for Cisco Digital Media Manager 5.2.x, pp. 26-1 to 26-8, May 31, 2011.
Comcast1—"DVR Guide—Dual Tuner HD Capable DVR"—Comcast, pp. 1-17, Jan. 2010.
Dave—"Direct TV DVR Menu Options", downloaded from http://www.pctechbytes.com/home-theater/direct-tv-dvr-menu-options/ on Feb. 3, 2013, pp. 1-3, Copyright 2003-2013.

(Continued)

*Primary Examiner* — Huy T Nguyen
(74) *Attorney, Agent, or Firm* — David Mims; Mark P Kahler

(57) ABSTRACT

A conflict analysis (CA) information handling system (IHS) receives conflict information from a population of digital video recorder (DVR) IHSs. The conflict information indicates that a conflictee show is in conflict with a conflictor show in a DVR IHS. The conflict information may include a conflictee show identifier and open timeslots for each DVR IHS that transmits conflict information to the CA IHS. Using the conflictee show identifier and available timeslots received from the population of DVR IHSs, the CA IHS makes a recommendation to rebroadcast the conflictee show at a particular time when more than an predetermined threshold number of DVR IHSs are available to record a rebroadcast of the conflictee show.

17 Claims, 7 Drawing Sheets

(56) References Cited

OTHER PUBLICATIONS

DirecTV—"How does prioritization affect recordings?", downloaded from http://support.directv.com/app/answers/detail/a_id/1842/~/how-does-prioritization-affect-recordings%3F on Feb. 3, 2013, pp. 1-2.

Dish—"Set Scheduled Event Priority", downloaded from http://www.mydish.com/support/set-scheduled-event-priority on Feb. 3, 2013, © 2013, pp. 1-3.

EPG—"Electronic program guide", downloaded from http://en.wikipedia.org/wiki/Electronic_program_guide on Feb. 9, 2013, pp. 1-6.

Eyepartner—"Electronic Program Guide", downloaded from http://www.eyepartner.com/tikilive/electronic-program-guide/ on Feb. 9, 2012, pp. 1-3.

Freeview—"The Freeview Smart EPG User Guide", downloaded from http://www.freeview.com.au/pdf/epg_howto.pdf on Feb. 9, 2013, pp. 1-14.

Liberty—"Liberty Communications Online Directory", downloaded from http://www.libertycommunications.com/index.php/services/digital-tv/dtv/tv-tip-of-the-month/62-dvr-menu, p. 1, Jan. 2011.

MythTV—"Myth TV, Open Source DVR", downloaded from http://www.mythtv.org/docs/mythtv-HOWTO-12.html on Feb. 7, 2013, pp. 1-11.

Wisegeek—"How Do I Program a DVR?", downloaded from http://www.wisegeek.com/how-do-i-program-a-dvr.htm, pp. 1-6, Copyright © 2003-2013.

Comcast2—"DVR Guide—Dual Tuner HD Capable DVR"-Comcast, pp. 1-28, Apr. 2009.

* cited by examiner

DIGITAL VIDEO RECORDER CONFLICT HANDLING EMPLOYING REBROADCAST REQUESTS

BACKGROUND

The disclosures herein relate generally to information handling systems (IHSs), and more specifically, to IHSs that process digital video recorder (DVR) conflicts. Conflicts may result when a DVR user attempts to record multiple shows, i.e. programs, at the same time. Increasing the number of tuners in a DVR may reduce such undesired program conflicts. However, program conflicts may still occur.

BRIEF SUMMARY

In one embodiment, a method is disclosed for handling conflict information that a population of multiple DVR IHSs generates. The method includes receiving, by a conflict analysis (CA) information handling system (IHS), conflict information from a plurality of digital video recorder (DVR) IHSs, the conflict information indicating that a particular show is in conflict with another show. The method also includes generating, by the conflict analysis IHS, a recommendation to rebroadcast the particular show in response to the conflict information received from the plurality of DVR IHSs. In one embodiment, as part of generating the recommendation to rebroadcast, the CA IHS determines if the number of conflicts for the particular show is greater than a predetermined threshold. The conflict information may include open time slot information such that the CA IHS receives open time slot information from those DVR IHSs exhibiting a conflict with respect to the particular show. In one embodiment, the method includes transmitting, by the conflict analysis IHS, rebroadcast information to a DVR IHS experiencing a conflict for the particular show, the rebroadcast information indicating when the particular show for which there was a conflict will be rebroadcast.

In another embodiment, a conflict analysis (CA) IHS includes a processor coupled to a system memory. The system memory including a conflict analysis engine that is configured to receive conflict information from a plurality of digital video recorder (DVR) IHSs, the conflict information indicating that a particular show is in conflict with another show. The system memory is further configured to generate a recommendation to rebroadcast the particular show in response to the conflict information received from the plurality of DVR IHSs.

In yet another embodiment, a conflict analysis computer program product is disclosed that includes a non-transitory computer readable storage medium. The computer program product includes first instructions that receive conflict information from a plurality of digital video recorder (DVR) IHSs, the conflict information indicating that a particular show is in conflict with another show. The computer program product also includes second instructions that generate a recommendation to rebroadcast the particular show in response to the conflict information received from the plurality of DVR IHSs. The first and second instructions are stored on the non-transitory computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
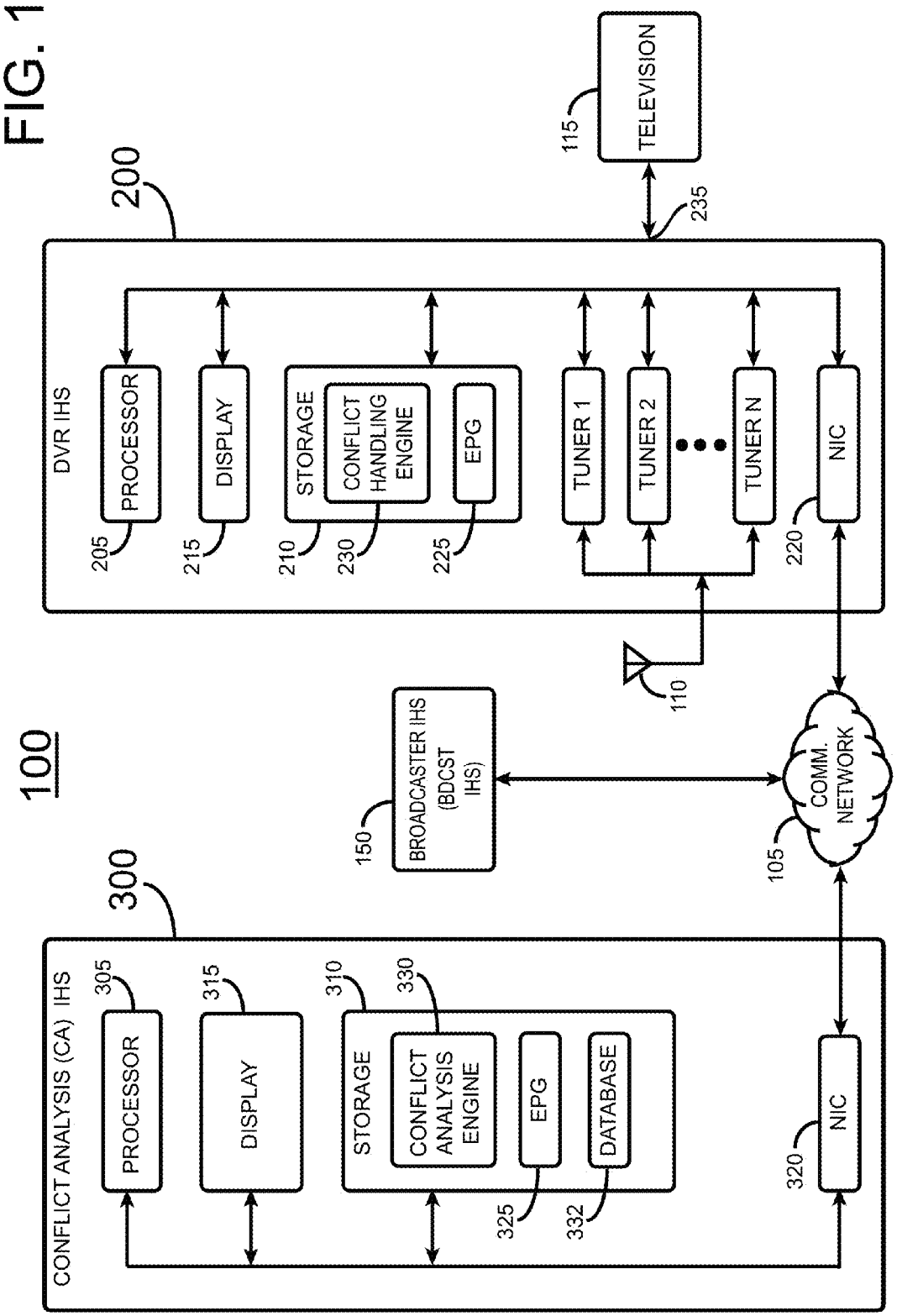
FIG. 1 is a block diagram of one embodiment of the disclosed conflict processing system.

The disclosed conflict processing system includes a digital video recorder (DVR) information handling system (IHS) that is capable of recording an audio/video show in a digital format to a disk drive or other storage medium. The DVR IHS may take the form of a standalone set-top box or other computing device that is capable of audio/video show capture and playback. The DVR IHS provides "time shifting", i.e. the recording of programming content to a storage medium to be viewed and listened to by the user at a later time. The DVR may also provide an "instant replay" feature that enables the user to quickly review recently rendered video. The DVR IHS may record shows, i.e. programs, that include programming content of interest to the user. The DVR IHS records shows that occur during respective predetermined time slots that are published in an electronic program guide (EPG). The DVR IHS stores a copy of the EPG. The EPG includes current and future programming and scheduling information to assist the user in show selection and recording. In this manner, the DVR IHS knows when each show begins and ends.

When a DVR IHS includes a single tuner, the possibility exists that the user may desire to watch one show while recording another show that is scheduled during the same time slot. A scheduling conflict thus exists. Alternatively, still in the case of a DVR IHS with one tuner, a scheduling conflict also exists if the user desires to record two shows during the same time slot.

When the DVR IHS includes two tuners, the possibility of a scheduling conflict still exists if the user desires to watch one show while recording two other shows. In that case, the user employs one tuner to watch a show, one tuner to record another show during the same time slot, while being unable to record yet another show during the same time slot. Alternatively, still in the case of a DVR IHS with two tuners, a scheduling conflict also exists if the user desires to record three or more shows during the same time slot.

Some shows would have a larger viewing audience if they did not conflict with another show that generates greater user interest. Many users would like to watch a show but can not because of a lack of tuners in their DVR to enable recording of multiple shows at the same time. In one embodiment, the disclosed methodology determines the best time to rebroadcast a particular show to achieve higher overall viewership for the broadcaster.

In one embodiment, the disclosed conflict processing system includes a DVR IHS that communicates with a conflict analysis (CA) IHS via a communication network such as the Internet. A broadcaster IHS may also couple to the DVR IHS and the CA IHS via the communication network. In actual practice, very large numbers of DVR IHSs, such as 10,000, 100,000, or even more may couple to the CA IHS in this manner. Each DVR IHS informs the CA IHS when a conflict occurs in that DVR IHS. The term "conflictor show" refers to a show that the user designates as having higher viewing priority over another show that is referred to as the "conflictee show". For example, in the case of a single tuner DVR IHS, the user may elect to watch or record a conflictor show while foregoing a lower priority conflictee show during the same time slot. In the case of a two tuner DVR IHS, the user may elect to watch one show and record another show during the same time slot, each of these shows being conflictor shows that will prevent the user from viewing or recording a conflictee show during the same time slot.

In one embodiment, the DVR IHS transmits conflictee show information to the CA IHS for each program that can not be scheduled for recording due to a conflict with a higher priority conflictor show. The conflictee show information identifies the conflicted show and its time slot. The DVR IHS may also transmit conflictor show information along with the associated conflictee show information to identify the particular show, i.e. program, that caused the conflict. The conflictee show information and conflictor show information are both forms of conflict information that the DVR IHS may transmit back to the conflict analysis (CA) IHS.

Each DVR IHS of a very large population of DVR IHSs may transmit conflictee show information and conflictor show information to the CA IHS. Using this information, the CA IHS determines an appropriate time for rebroadcasting a particular show to a group of DVR IHS users. The CA IHS sends a rebroadcasting recommendation to the broadcaster IHS. The rebroadcast recommendation includes a conflictee show identifier and an associated recommended time slot for rebroadcasting the identifier show. If the broadcaster accepts the recommendation, then the broadcaster IHS transmits the conflictee show ID and associated rebroadcast time to the DVR IHSs of the group of users that experienced the conflict. In response, the DVR IHSs schedule the rebroadcast for recording at the designated rebroadcast time. In one embodiment, the DVR IHSs transmit not only information that indicates a past conflict, but also information that indicates other conflicts with the desired conflictee show. In this manner, the CA IHS can avoid a cascading conflict by selecting a rebroadcast time that does not conflict with other programs. This enables a broadcaster to optimize the future rebroadcast time to enable a majority or other acceptable number of users to record the rebroadcast.

FIG. 1 is a block diagram of one embodiment of the disclosed conflict processing system 100. Conflict processing system 100 includes a digital video recorder (DVR) IHS 200 that couples via a communication network 105 to a conflict analysis (CA) IHS 300. DVR IHS 200 includes N tuners, wherein N is an integer equal to one or more. In one embodiment, communication network 105 may employ the Internet, or other wired or wireless network. As shown in FIG. 1, DVR IHS 200 includes tuner 1, tuner 2, . . . tuner N, each tuner being selectably tunable to multiple TV channels for viewing or recording purposes. Each tuner may access one channel at a time to receive a show on that channel. In one embodiment, tuners 1, 2, . . . N couple to an antenna 110 or other source of television stations transmitted by broadcasters. One example of such a source is a cable TV service that provides multiple channels that each carry shows in respective time slots. DVR IHS 200 includes a processor 205 that couples via intermediate circuitry (not shown) to tuners 1, 2, . . . N, storage 210, display 215 and network interface controller (NIC) 220. Processor 205 controls the operation of DVR IHS 200. Storage 210 stores an electronic program guide (EPG) 225 that includes of the schedule of current and future shows. The EPG 225 includes scheduling information such as the name of each show, the time slot of the show, the channel of the show and optionally a brief synopsis of the show. EPG 225 may be continuously updated via communication network 105 as more scheduling information becomes available. A television monitor 115 couples to output port 235 so that the viewer may view recorded shows.

Storage 210 stores a conflict handling engine 230 that detects conflicts between TV shows that the user desires to watch or record during the same time slot. Tuners such as tuners 1 and 2 may each receive one channel at a time. A conflict occurs in a particular time slot when the user attempts to record more shows than there are tuners available to record during that particular time slot. For example, if DVR IHS 200 includes one tuner (i.e. N=1, no tuner 2 present), a conflict exists if the user selects a particular show to record during a particular time slot, and then also attempts to select another show for recording during the same time slot. With only one tuner available, there is no tuner available to record another show. A conflict exists whenever the user attempts to instruct DVR 200 to record or view N+1 shows during the same time slot. Conflict handling engine 230 in cooperation with EPG 225 detects such conflicts whenever they occur.

If DVR 200 includes two tuners, namely tuner 1 and tuner 2 (i.e. N=2, no tuner 3 or higher present), then a conflicts exists if the user selects two shows to record during a particular time slot and also attempts to view or record a third show during the same time slot. With only two tuners available, there is no tuner available to record another show during the same time slot. Thus, a conflict exists because the user is attempting to instruct DVR 200 to record or view N+1 shows during the same time slot. Conflict handling engine 230 in cooperation with EPG 225 detects such a conflict whenever it occurs.

When conflict handling engine 230 detects a conflict wherein the user attempts to record or view N+1 shows during the same time slot, conflict handling engine 230 transmits conflict information via communication network 105 to conflict analysis (CA) IHS 300. The conflict information includes conflictee show information such as a unique conflictee show identifier, the name of the conflictee show and the time slot of the conflicted show. The conflict information may optionally include conflictor show information describing the conflictor show that caused the conflict, namely the show that the user gave higher priority and that is selected for recording at the expense of the conflicted show not being recorded. More particularly, the conflictor show information may include a unique conflictor show identifier, the name of the conflictor show and the time slot of the conflictor show. Along with the conflict information described above, conflict handling engine 230 also transmits to CA IHS 300 open time slot information for each of the tuners of DVR IHS 200. The open time slot information describes those times when each tuner is available for recording. The open time slot information may be in constant flux if the user frequently programs additional shows into DVR IHS 200 for recording. In one embodiment, conflict handling engine 230 transmits open time slot information to CA IHS 300 each time the user revises the shows that DVR IHS 200 will record. Conflict handling engine 230 sends conflict information and open time slot information to CA IHS 300 for analysis as discussed in more detail below. While FIG. 1 shows a single representative DVR IHS 200, it should be understood that in actual practice the number of DVR IHSs may be a very large number such as tens of thousands, or hundreds of thousands or more DVR IHSs.

In one embodiment, the open time slot information of a particular DVR IHS includes all time slots for which a tuner is not currently programmed for recording a show. In another embodiment, the open time slot information includes all times when the DVR IHS is not currently programmed to record a show minus those times that the user historically uses television 225 to watch another show at its scheduled time by using one of the available tuners. In that embodiment, DVR IHS 200 determines those time slots when, although the user is not recording a show, historically the user is using one of the tuners available in DVR IHS 200 to view a show in real time. Once recorded, viewing a show does not consume a tuner. Storage 210 includes a database (not shown) that store those times when historically the user is using a tuner in DVR IHS 200 to watch a show in real time, i.e to watch a show that is not recorded and at its normally scheduled time. In this manner, to determine the time slots that are actually open to record a broadcast, conflict handling engine 230 may subtract those time slots when the user historically is known to already watch a show that consumes a tuner from the time slots for which no show is scheduled to be recorded. This provides a more realistic determination of actually open time slots that are truly open for recording shows.

Conflict analysis (CA) IHS 300 includes a processor 305 that couples via intermediate circuitry (not shown) to storage 310, display 315, and network interface controller (NIC) 320. Storage 310 stores a conflict analysis engine 330 that analyzes conflict information that CA IHS 300 receives from DVR IHS 200 to determine an appropriate time to rebroadcast a show for which conflicts occurred in a predetermined number of DVRs 200. Each conflictee show identifier that CA IHS 300 receives from DVR IHS 200 acts as a "rebroadcast request". For rebroadcast to be worthwhile to the broadcaster, CA IHS 300 should receive more than a predetermined threshold number of requests for rebroadcast. The broadcaster may determine and provide this threshold number to CA IHS 300. For example purposes, assume that the threshold number of requests for rebroadcast is 50,000 rebroadcast requests for a particular show. In this particular example, if the number of rebroadcast requests that CA IHS 300 receives is greater than the threshold, then CA IHS 300 generates a rebroadcast recommendation of the particular show. CA IHS 300 transmits the rebroadcast recommendation to broadcaster (BDCST) IHS 150 via communication network 105.

In one embodiment, the rebroadcast recommendation includes the conflictee show identifier. In another embodiment, the rebroadcast recommendation includes the conflictee show identifier and the corresponding conflictor show identifier. In yet another embodiment, the rebroadcast recommendation includes the conflictee show identifier, the conflictor identifier and a proposed time slot for rebroadcast. CA analysis engine 325 determines the proposed time slot for rebroadcast by finding a common time slot than is open for the first highest number of DVR IHSs 200 that transmitted a request for rebroadcast of a particular show. CA analysis engine 325 may determine another proposed time slot for rebroadcast by finding a time slot that is open for the second highest number of DVR IHS 200 that transmitted a request for rebroadcast of the particular show. Broadcaster IHS 150 receives rebroadcast recommendations from CA IHS 300. A broadcaster who accesses broadcaster IHS 150 may use the proposed time slots for rebroadcast to select the actual time for rebroadcast of the particular show. While FIG. 1 shows CA IHS 300 and broadcaster IHS 150 as being physically separate, in one embodiment CA IHS 300 and broadcaster IHS 150 may be integrated in the same structure or be physically situated at the same location.

Figure 2:
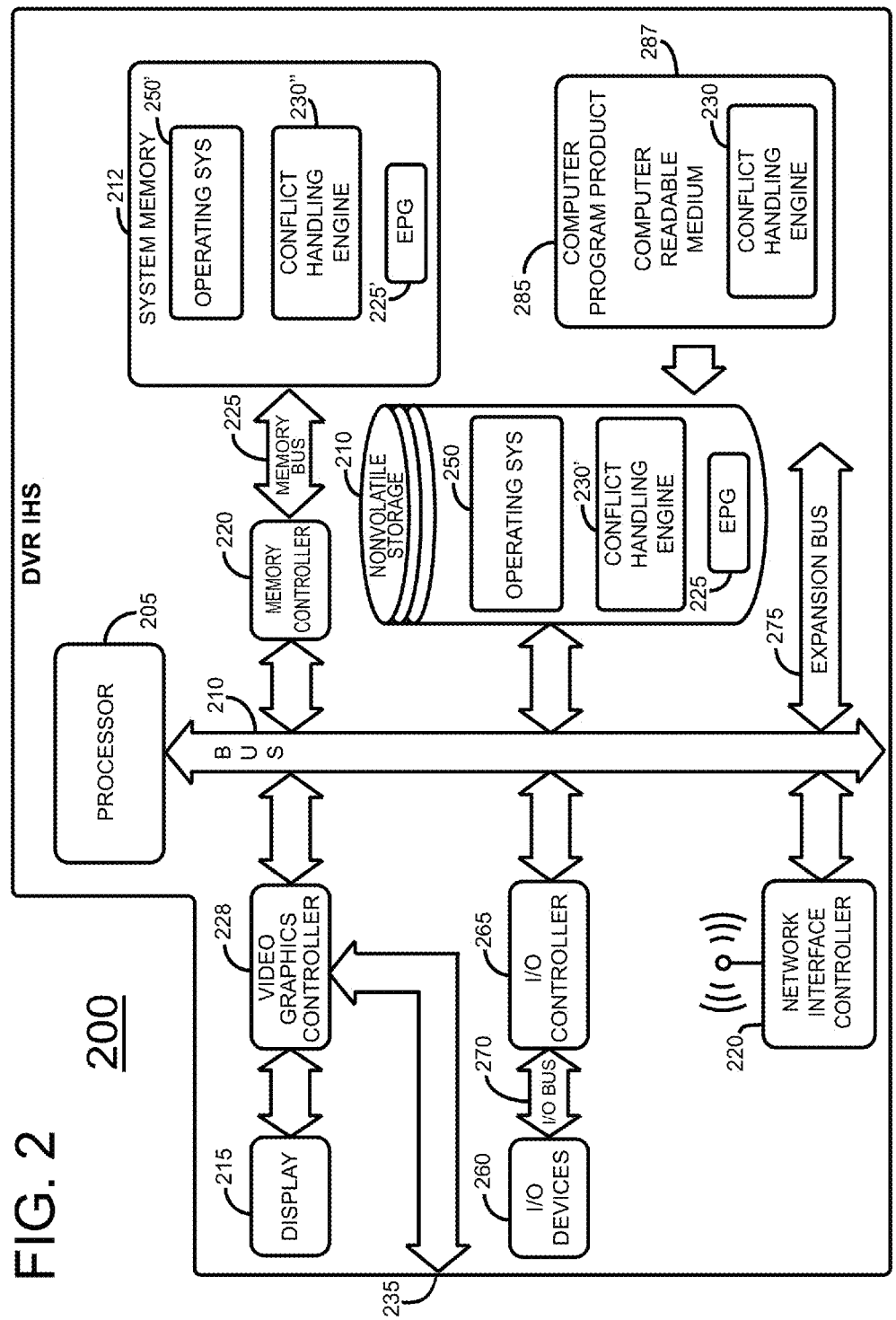
FIG. 2 is a block diagram of an information handling system (IHS) that may be used as the digital video recorder (DVR) IHS of the conflict processing system.

FIG. 2 is a block diagram of an information handling system that may be employed as DVR IHS 200 to practice the disclosed conflict handling methodology. DVR IHS 200 includes a processor 205 that may include multiple cores. DVR IHS 200 processes, transfers, communicates, modifies, stores or otherwise handles information in digital form, analog form or other form. DVR IHS 200 includes a bus 210 that couples processor 205 to memory 212 via a memory controller 220 and memory bus 225. System memory 212 may also be referred to as main memory. System memory 212 may be a static random access memory (SRAM) array or a dynamic random access memory (DRAM) array. Processor 205 may also include local memory such as L1, L2 and L3 caches. A video graphics controller 228 couples display 215 to bus 210. Video graphics controller 228 also couples to an output port 235 to drive an external television or video monitor (not shown). Nonvolatile storage 210, such as a hard disk drive, solid state drive (SSD), CD drive, DVD drive or other nonvolatile storage couples to bus 210 to provide DVR IHS 200 with permanent storage of information. System memory 112 and nonvolatile storage 210 are both forms of memory stores. Nonvolatile storage 210 stores an operating system 250 (OPERATING SYS) that governs operation of DVR IHS 200. Nonvolatile storage 210 also stores one or more applications, such as conflict handling engine 230', that processor 205 executes. I/O devices 260, such as a keyboard and a pointing device, couple to bus 210 via I/O controller 365 and I/O bus 270.

One or more expansion busses 275, such as USB, IEEE 1394 bus, ATA, SATA, PCI, PCIE, DVI, HDMI and other busses, couple to bus 210 to facilitate the connection of peripherals and devices to DVR IHS 200. A network interface controller (NIC) 220 couples to bus 210 to enable DVR IHS 200 to connect by wire or wirelessly to a network and/or other information handling systems. Network interface controller 220 may also be called a network communication adapter or a network adapter. While FIG. 1 shows one IHS that employs processor 205, the IHS may take many forms. For example, IHS 200 may take the form of a desktop, server, portable, laptop, notebook, tablet, or other form factor computer or data processing system. IHS 200 may take other form factors such as a gaming device, a personal digital assistant (PDA), a portable telephone device, a communication device or other devices that include a processor and memory.

Figure 4:
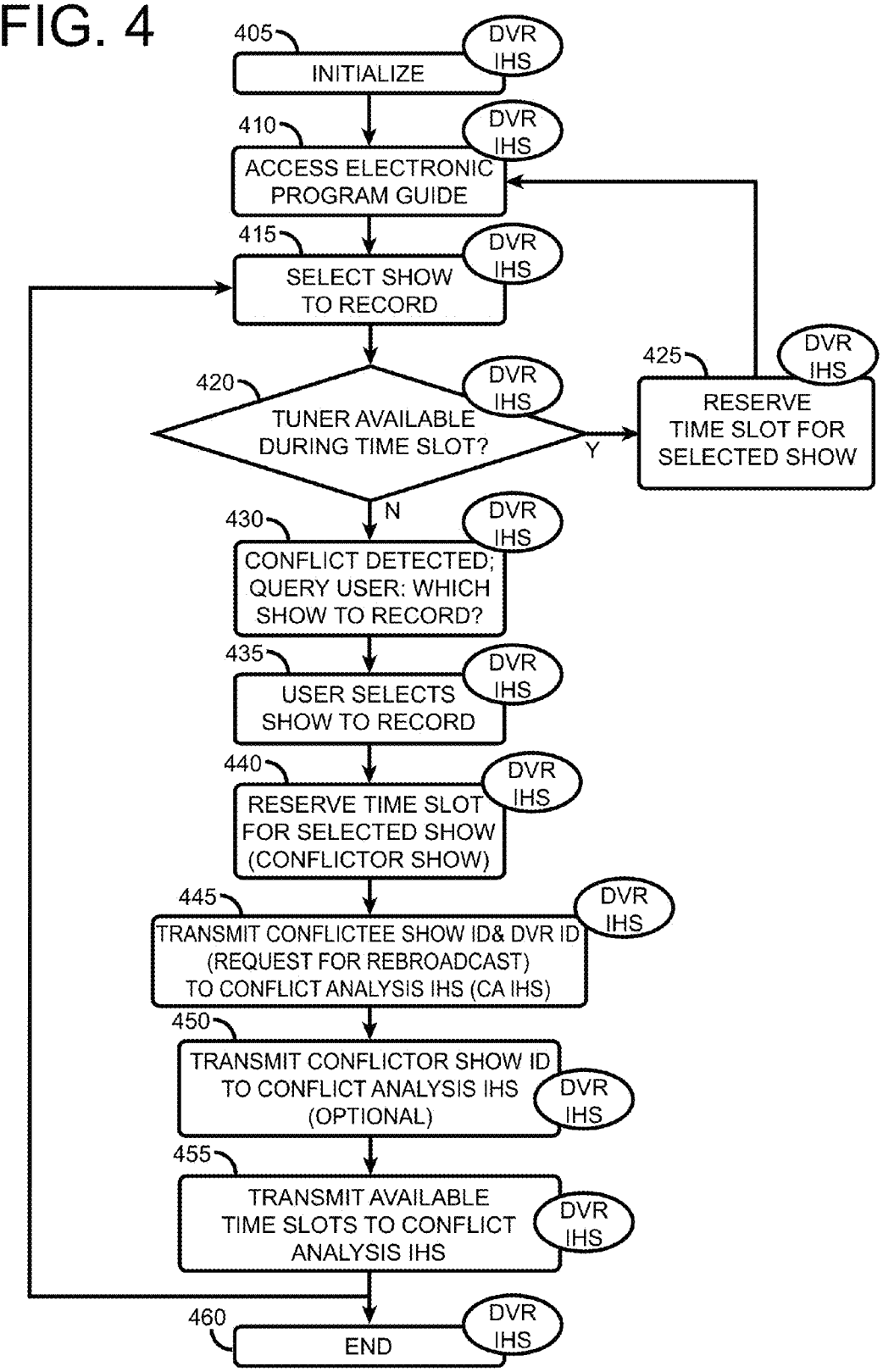
FIG. 4 is a flowchart that shows one way in which the digital video recording (DVR) IHS of FIG. 2 may operate in the disclosed conflict processing system.
Figure 7:
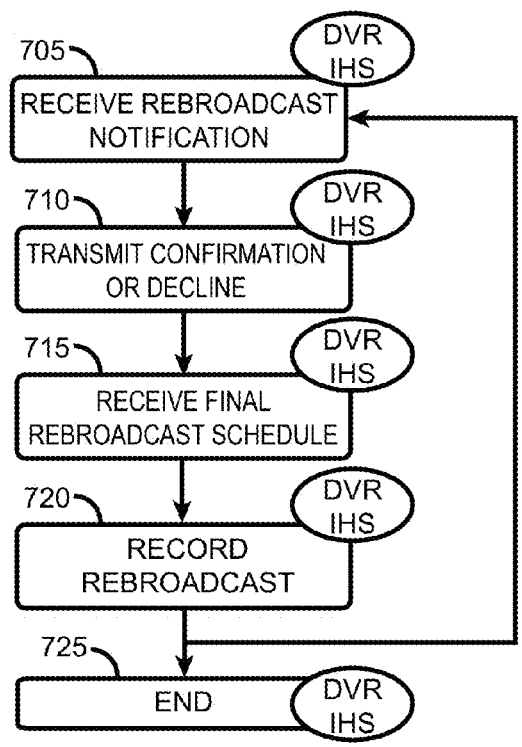
FIG. 7 is a flowchart that shows other methodology that the digital video recording (DVR) IHS of FIG. 2 may employ in the disclosed conflict processing system.

In one embodiment, DVR IHS 200 employs a conflict handling computer program product 285 that includes a conflict handling engine 230 stored on a computer readable medium 287 such as a CD, DVD, flash drive or other media. In actual practice, a user or other entity may load conflict handling engine 230 in nonvolatile storage 210 as conflict handling engine 230'. Nonvolatile storage 210 may also store operating system (OPERATING SYS) 250 and electronic program guide (EPG) 225. When DVR IHS 200 initializes, the DVR IHS loads conflict handling engine 230', EPG 225 and operating system 250 into system memory 212 for execution as conflict handling engine 230'', EPG 225' and operating system 150'. The flowcharts of FIGS. 4 and 7 provide more detail with respect to the operation of conflict handling engine 230 and are discussed in more detail below. For simplicity, FIG. 2 does not show tuner 1, 2, . . . N in DVR IHS 200. However, it should be understood that DVR IHS 200 includes N tuners, such as shown in FIG. 1. DVR IHS 200 controls the operation of the N tuners with respect to show selection from EPG 225 and subsequent recording and playback of shows.

Figure 3:
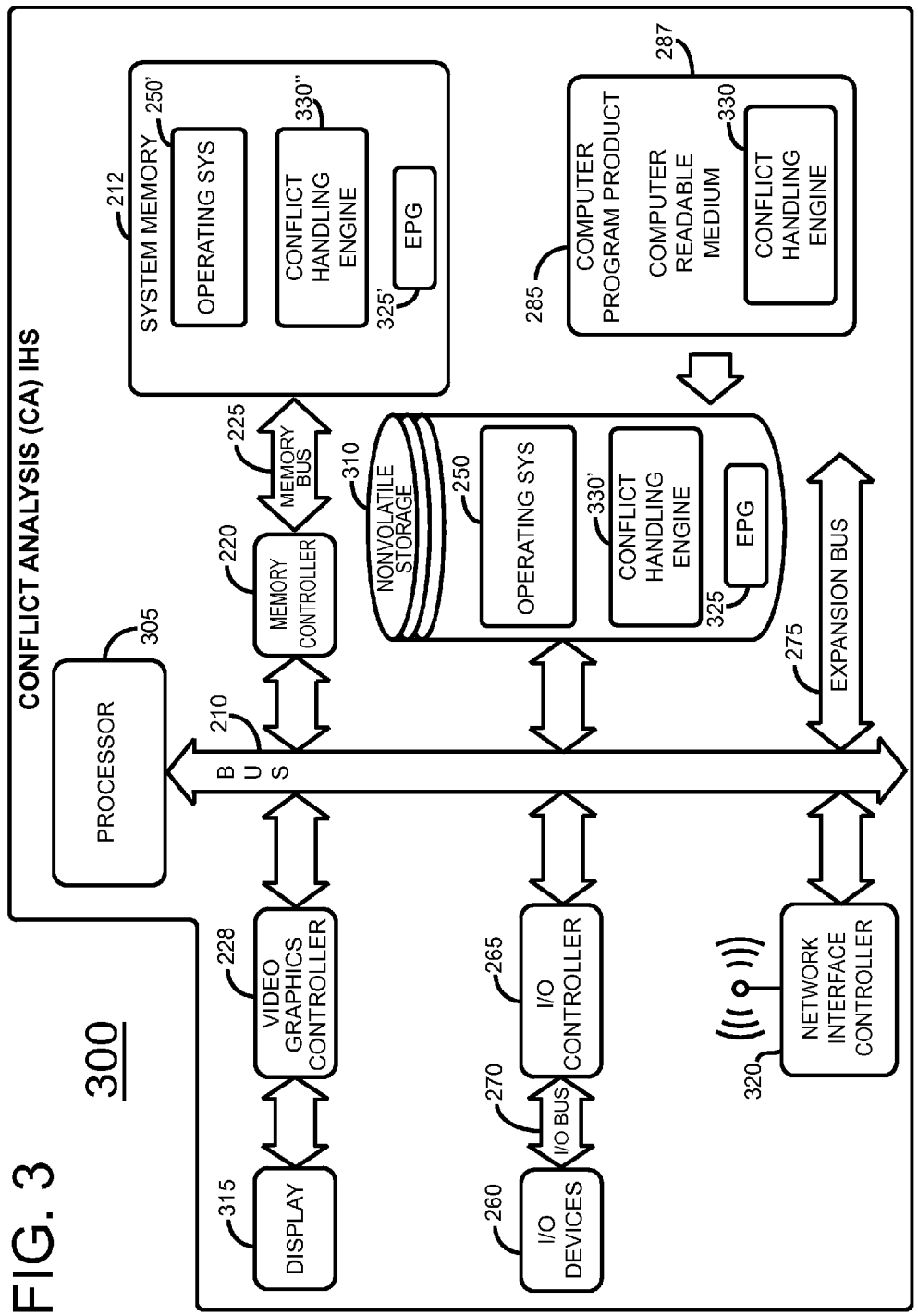
FIG. 3 is a block diagram of an information handling system (IHS) that may be used in the conflict analysis (CA) IHS of the disclosed conflict processing system.

FIG. 3 is a block diagram of an information handling system that may be employed as conflict analysis (CA) IHS 300 to practice the disclosed conflict handling and conflict analysis methodology. CA IHS 300 includes many elements in common with DVR IHS 200 of FIG. 2. Like numbers indicate like elements when comparing CA IHS 300 of FIG. 3 with DVR IHS 200 of FIG. 2. However, whereas DVR IHS 200 of FIG. 2 includes processor 205, display 215, storage 210, NIC 220, and electronic programming guide (EPG) 225, it is noted that CA IHS 300 of FIG. 3 includes processor 305, display 315, storage 310, NIC 320 and electronic programming guide (EPG) 325. In one embodiment, EPG 225 and EPG 325 are substantially the same programming guide such that each is in sync with the other. Moreover, CA IHS 300 of FIG. 3 includes conflict analysis engine 330, whereas DVR IHS 200 of FIG. 2 includes conflict handling engine 230.

Conflict analysis engine 330 of FIG. 3 receives conflict information such as conflictee show information from DVR IHS 200. After receiving more than a predetermined threshold number of requests for rebroadcast of a particular show that was conflicted out by a conflictor show, conflict analysis engine 330 generates a recommendation to rebroadcast the particular show. The recommendation to rebroadcast the particular show includes a conflictee show identifier and a preferred time to rebroadcast the particular show. In one embodiment, conflict analysis engine 330 determines the best time to recommend a rebroadcast by determining a particular time slot that the most DVR IHSs have as an open time slot. The rebroadcast recommendation may also include a second time to recommend a rebroadcast by determining the time slot which is open for the most DVR IHSs after the best time. In one embodiment, conflict analysis engine 330 determines the best time slot for rebroadcast by analyzing those DVR IHSs requesting rebroadcast of a particular show, not all DVR IHSs in the entire population of DVR IHSs.

Figure 5:
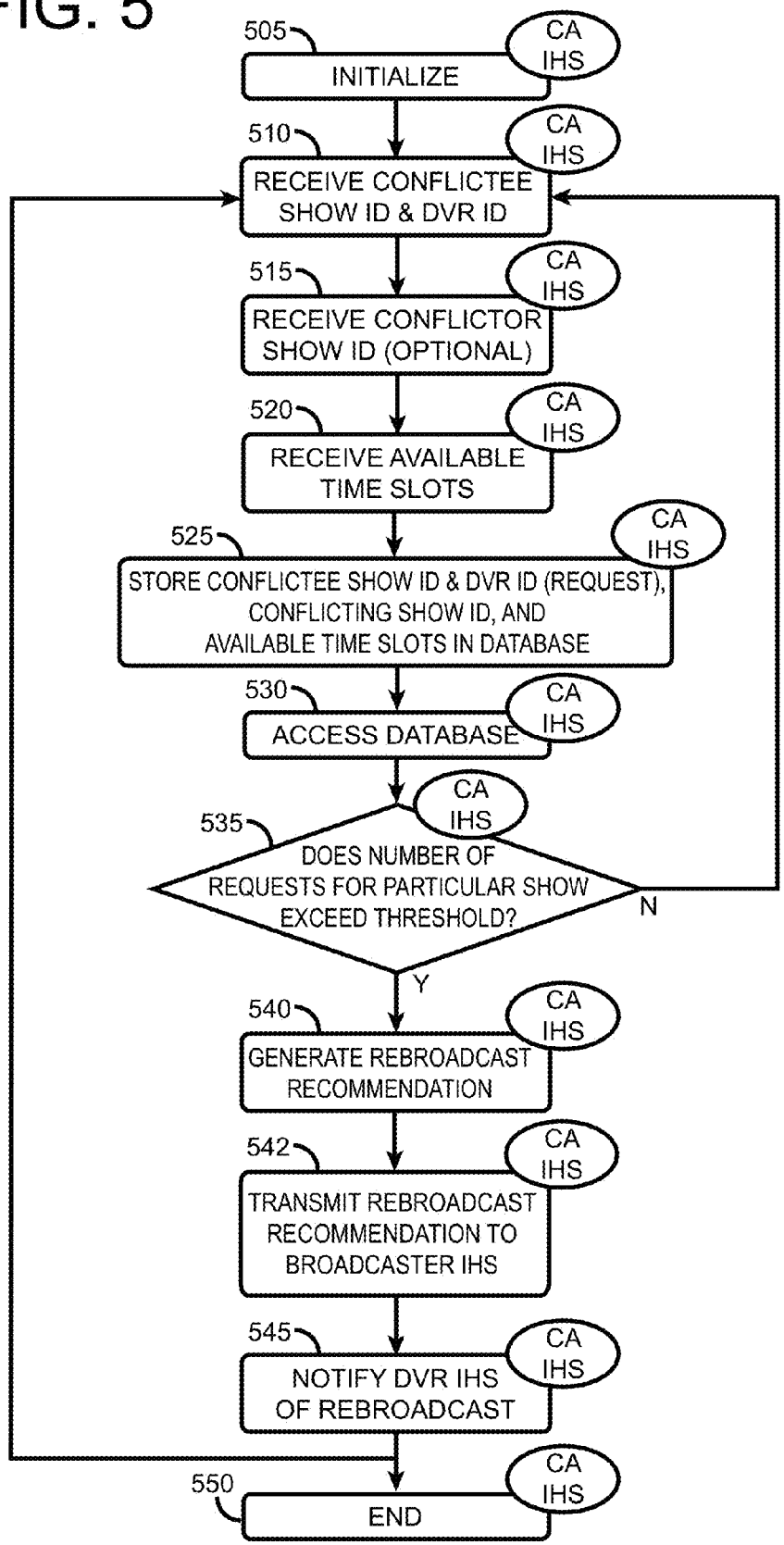
FIG. 5 is a flowchart that shows one way in which the conflict analysis (CA) IHS of FIG. 3 may operate in the disclosed conflict processing system.
Figure 6:
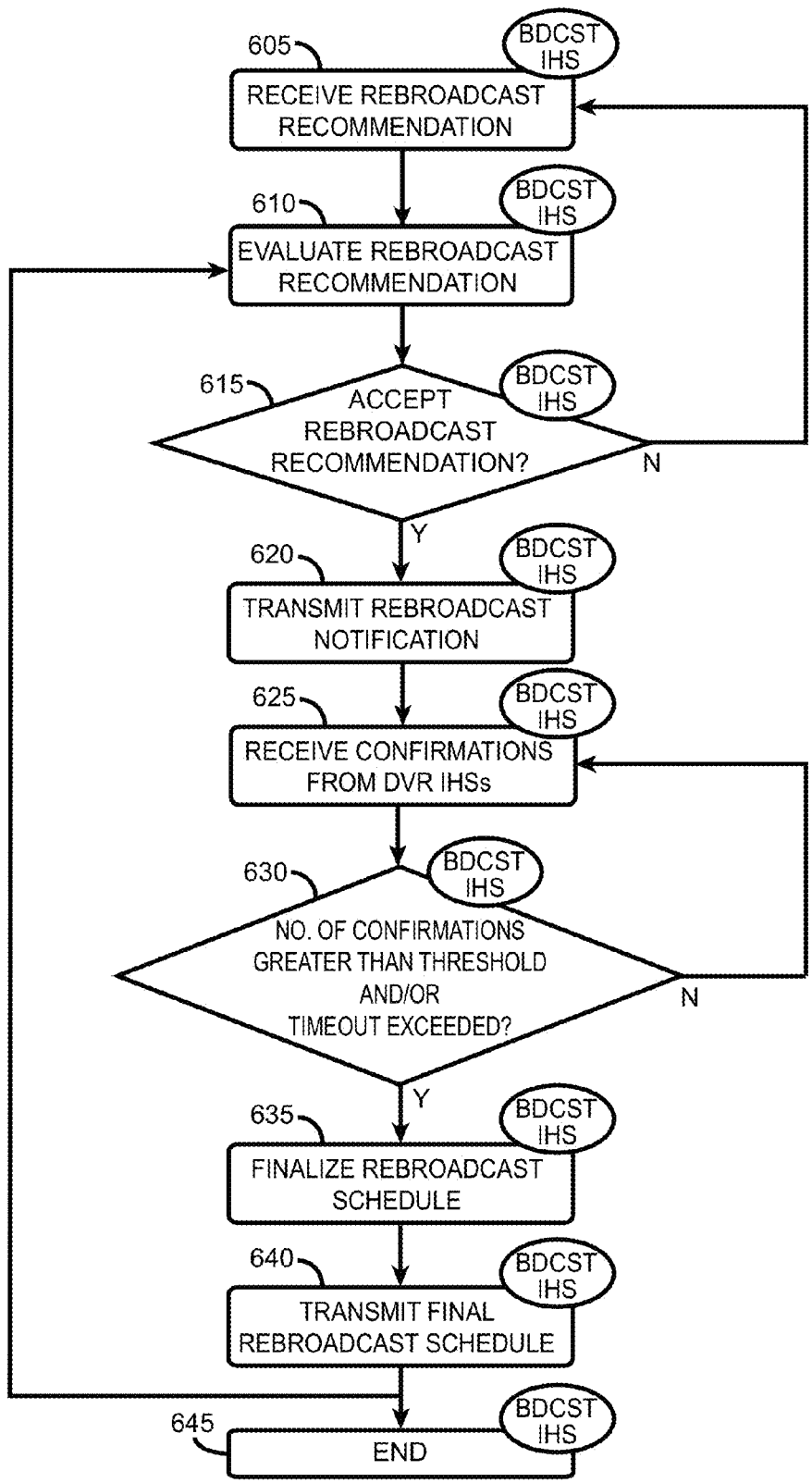
FIG. 6 is a flowchart that shows one way in which a broadcast (BDCST) IHS of FIG. 1 may operate in the disclosed conflict processing system.

CA IHS 300 transmits the recommendation to rebroadcast to broadcaster IHS 150 that is operated by a broadcaster, such as a major television network or other broadcast entity. The broadcaster may accept or reject the rebroadcast recommendation at broadcaster IHS 150. If the broadcaster rejects the rebroadcast recommendation, then no further action is required. However, if the broadcaster accepts the rebroadcast recommendation at broadcaster IHS 150, then the broadcaster inputs an acceptance into broadcaster IHS 150. In response to this acceptance, broadcaster IHS 150 transmits a rebroadcast notification to those DVR IHSs 200 that requested rebroadcast of the particular program. The rebroadcast notification includes rebroadcast information such as the conflictee show identifier and the particular time slot during which recording of the rebroadcast is recommended. The flowcharts of FIGS. 5 and 6 provide more detail with respect to the operation of conflict analysis engine 330 and broadcaster IHS 150, respectively, and are discussed in more detail below.

FIG. 4 is a flowchart that depicts a representative process flow in the operation of conflict handling engine 230 in DVR IHS 200. Process flow commences when processor 205 initializes, as per block 405. Processor 205 accesses the electronic program guide (EPG) 225, as per block 410, upon DVR IHS 200 receiving an input command from the user. The user may input such input commands to DVR 200 via a handheld remote, keyboard or other input device (not shown). Upon successfully accessing EPG 225, the user selects a particular show to record in a particular associated time slot, as per block 415, again using the input device.

Conflict handling engine 230 performs a test to determine if a tuner is available for recording the particular show during the particular show's timeslot, as per decision block 420. If conflict handling engine 230 determines that a tuner is available during the particular show's time slot, then DVR 200 reserves that particular timeslot for recording the particular show, as per block 425. In this case, DVR 200 will record the particular show when the particular timeslot ultimately occurs. After reserving the timeslot and tuner for recording in this matter, process flow continues back to accessing EPG 225, as per block 410.

However, if at decision block 420 it is determined that a tuner is not available to record the selected show during the associated particular time slot, then a conflict exists. In response to determining that a conflict exists in this manner, DVR IHS 200 displays a query to the user asking the user, "which show to record?", as per block 430. DVR IHS 200 may display the query on internal display 215 and/or television 115. The user selects which show to record and inputs that selection to DVR IHS 200, as per block 435. In response, DVR IHS 200 reserves the particular time slot and tuner for the associated particular selected show, as per block 440. Storage 210 may retain such show selection. The particular show that the user selects for recording becomes the conflictor show, while the particular show for which a tuner is not available becomes the conflictee show. The user's selection of the conflictor show prevents the conflictee show from being recorded or currently being watched because no tuner is available.

Conflict handling engine 230 of DVR 200 transmits conflict information to conflict analysis engine 330 of CA IHS 300, as per block 445. This conflict information includes the conflictee show identifier (ID) for the particular show that is not scheduled for recording due to the conflict. The conflict information also includes a DVR identifier (DVR ID) that uniquely identifies the particular DVR IHS experiencing the conflict. The conflictee show ID and DVR ID sent to CA IHS 300 together act as a rebroadcast request that effectively asks CA IHS 300 to arrange for rebroadcast of the conflictee show at a later time, as per block 445. Conflict handling engine 230 of DVR 200 may optionally transmit the conflictor show identifier for the particular selected show that is causing the conflict, as per block 450. Conflict handling engine 230 also transmits available time slot information to CA IHS 300, as to block 455. The time slot available information includes all time slots that are open and available for recording of a potential later rebroadcast of the conflictee show. Process flow terminates at the end block 460, or alternatively returns to block 415 for selection of another show to record by the user. While FIG. 4 shows process flow for one DVR IHS 200, it should be understood that in actual practice a very large numbers of DVR IHSs 200 will be performing this process at the same time. All of these DVR IHSs 200 will be reporting conflictee show information, conflictor show information, and available time slots to CA IHS 300 during the same reporting time period. This reporting time period during which the DVR IHSs 200 transmit conflict information to the CA IHS 300 may extend from a few days to several weeks or longer, depending upon the particular application.

FIG. 5 is a flowchart that depicts a representative process flow in the operation of conflict analysis engine 330 in CA IHS 300. Process flow commences when processor 305 initializes, as per block 505. Conflict analysis engine 330 receives conflictee show identifiers and associated DVR identifiers from the population of DVR IHSs 200 over the reporting period, as per block 510. During the reporting period, conflict analysis engine 330 may also receive conflictor show identifiers from the population of DVR IHSs 200. During the same reporting period, conflict analysis engine 330 may also receive available time slots from DVR IHSs 200, as per block 520.

For each DVR IHS 200 that transmits a request for rebroadcast, CA engine 330 stores a database entry in rebroadcast request database 332 of FIG. 1, wherein the database entry includes the DVR identifier of the DVR IHS submitting the rebroadcast request, the conflictee show identifier and the available time slots for that particular DVR IHS. It will thus be appreciated that in one embodiment, rebroadcast request database 332 will have a respective entry for each DVR IHS 200 that submits a rebroadcast request to CA IHS 300.

At a predetermined time during the reporting period or at the end of the reporting period, conflict analysis engine 330 accesses database 332. Conflict analysis engine 330 performs a test to determine if the number of rebroadcast requests for a particular show exceeds a predetermined threshold number, as per decision block 535. If the number of rebroadcast requests for a particular show does not exceed the predetermined threshold, then process flow continues back to block 510 to wait for the reception of more conflict information from the population of DVR IHSs 200. However, if at decision block 535, conflict analysis engine 330 determines that the number of rebroadcast request received for a particular show exceeds the predetermined threshold number, then conflict analysis 330 generates a rebroadcast recommendation for the particular show, as per block 540. In one embodiment, conflict analysis engine 330 transmits the rebroadcast recommendation to broadcaster IHS 150 via communication network 105, as per block 542. The rebroadcast recommendation may include the conflictee identifier that identifies the particular show for which CA IHS 300 recommends rebroadcast. The rebroadcast recommendation may also include suggested timeslots for rebroadcast of that particular show. The suggested timeslots may include a first suggested timeslot during which the greatest number of DVR IHSs are available to record the rebroadcasted show. The suggested timeslots may also include a second suggested timeslot during which the next highest number of DVR IHSs is available to record the rebroadcasted show.

If approved by the broadcaster, the conflict analysis engine 330 of CA IHS 300 may transmit a rebroadcast notification to all DVR IHSs that requested rebroadcast of the particular show, as per block 545. The rebroadcast notification includes the DVR identifier, the conflictee show identifier and the timeslot during which the broadcaster will rebroadcast the conflictee show. Alternatively, broadcaster IHS 150 may transmit this rebroadcast notification to the relevant DVR IHSs after accepting the rebroadcast recommendation from conflict analysis IHS 300. Process flow terminates at the end block 550, or alternatively returns to block 510 for processing of more conflict information.

FIG. 6 is a flowchart that depicts a representative process flow in the operation of broadcaster (BDCST) IHS 150. Broadcaster IHS 150 receives a broadcast recommendation from conflict analysis IHS 300, as per block 605. Broadcaster IHS 150 evaluates the rebroadcast recommendation, as per block 610. For example, broadcaster IHS 150 may test to determine if for a particular broadcast recommendation that the total number of requests for rebroadcast of a particular show is greater than a particular threshold level. The threshold level that broadcaster IHS 150 uses to determine whether or not to accept the rebroadcast recommendation may be different from the threshold level that conflict analysis engine 330 of CA IHS 300 employs to make the rebroadcast recommendation to broadcaster IHS 150.

If broadcaster IHS 150 does not currently accept the rebroadcast recommendation at decision block 615, then process flow continues back to block 605 at which broadcaster IHS 150 waits to receive additional rebroadcast recommendations. However, if broadcaster IHS 150 accepts the broadcast recommendation at decision block 615, then broadcaster IHS 150 transmits a rebroadcast notification to all DVR IHSs 200 to which this particular rebroadcast notification relates, as per block 620. As discussed above, a representative rebroadcast notification includes the DVR identifier, the conflictee show identifier and the timeslot during which the conflictee show will be rebroadcast. In one embodiment, broadcast IHS 100 transmits rebroadcast notification only to those particular DVR IHSs affected by the rebroadcast notification. Each DVR IHS 200 that receives a rebroadcast request and that accepts the rebroadcast request transmits a confirmation back to broadcaster IHS 150. The confirmation includes the DVR identifier, the conflictee show identifier and the associated timeslot for which the DVR allocates a tuner.

Broadcaster IHS 150 receives confirmations back from those DVR IHSs 200 that commit to recording the show to be rebroadcasted. Broadcaster IHS 150 performs a test to determine if the total number of confirmations that it receives is greater than a predetermined threshold number and/or a predetermined timeout period is exceeded, as per decision block 630. If the number of confirmations that broadcaster IHS 150 receives does not currently exceed the threshold and/or the timeout is not exceeded, then process flow continues back to block 625 at which broadcaster IHS 150 waits to receive additional confirmations from the DVR IHSs. However, if the number of confirmations does exceed the predetermined threshold and/or the timeout is exceeded, then broadcaster IHS 150 finalizes the rebroadcast schedule, as per block 635. Broadcaster IHS 150 transmits a final rebroadcast schedule to those DVR IHSs that committed to recording the rebroadcasted show, as per block 640. Process flow terminates at and block 645, or alternatively flows back to block 610 at which broadcaster IHS 150 continue to evaluate rebroadcast recommendations that it receives from CA IHS 300.

FIG. 7 is a flowchart that depicts a representative process flow in the operation of DVR IHS 200 upon receiving a rebroadcast notification from broadcaster IHS 150, as per block 705. Each DVR IHS 200 that receives a rebroadcast notification transmits a response back to broadcaster IHS 150. This response may be a confirmation that the DVR IHS 200 will record the rebroadcasted conflictee show or a non-confirmation that the DVR 200 declines to record the rebroadcasted conflictee show. If broadcaster IHS 150 receives a sufficient number of rebroadcast confirmations such that it transmits a finalized rebroadcast schedule to DVR IHSs 200, then DVR IHSs 200 receive the final broadcast schedule, as per block 715. This final broadcast schedule includes the conflictee show identifier and associated timeslot during which broadcast IHS 150 will rebroadcast the conflictee show. When the timeslot ultimately occurs, DVR IHSs 200 records the rebroadcasted conflictee show, as per block 720. Process flow terminates at end block 720, or alternatively flows back to block 705 at which DVR IHS 200 continues to listen to receive rebroadcast notifications.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 4-7 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIGS. 4-7 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIGS. 4-7 described above.

The flowchart of FIGS. 4-7 illustrates the architecture, functionality, and operation of possible implementations of systems, methods and computer program products that perform analysis in accordance with various embodiments of the present invention. In this regard, each block in the flowcharts of FIGS. 7 and 8 may represent a module, segment, or portion of code, which comprises one or more executable instructions for implementing the specified logical function(s). It should also be noted that, in some alternative implementations, the functions noted in the block may occur out of the order noted in FIGS. 4-7. For example, two blocks shown in succession may, in fact, be executed substantially concurrently, or the blocks may sometimes be executed in the reverse order, depending upon the functionality involved. It will also be noted that each block of FIGS. 4-7 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, by a conflict analysis (CA) information handling system (IHS), conflict information from a plurality of digital video recorder (DVR) IHSs, the conflict information indicating that a particular show is in conflict with another show; and
    generating, by the conflict analysis IHS, a recommendation to rebroadcast the particular show in response to the conflict information received from the plurality of DVR IHSs, wherein generating the recommendation to rebroadcast is further in response to determining that the number of conflicts for the particular show is greater than a predetermined threshold.

2. The method of claim 1, wherein the conflict information includes open time slot information such that the CA IHS receives open time slot information from those DVR IHSs exhibiting a conflict with respect to the particular show.

3. The method of claim 1, further comprising transmitting, by the conflict analysis IHS, rebroadcast information to a DVR IHS experiencing a conflict for the particular show, the rebroadcast information indicating when the particular show for which there was a conflict will be rebroadcast.

4. The method of claim 2, further comprising:
determining, by the conflict analysis IHS, a time to rebroadcast the particular show that is related to the open time slot information received from the plurality of DVR IHSs.

5. The method of claim 1, wherein the conflict information includes a conflictee show identifier that identifies the particular show that is in conflict with another show in a DVR IHS, the another show being a conflictor show.

6. The method of claim 2, wherein the open time slot information indicates time slots when a particular DVR IHS is not programmed to record a show and wherein the time slot is historically not in use for viewing a program by a user of the DVR IHS.

7. A conflict handling (CA) information handling system (IHS), comprising:
a processor:
a system memory coupled to the processor, the system memory including a conflict analysis engine that is configured to:
receive conflict information from a plurality of digital video recorder (DVR) IHSs, the conflict information indicating that a particular show is in conflict with another show; and
generate a recommendation to rebroadcast the particular show in response to the conflict information received from the plurality of DVR IHSs, wherein the recommendation to rebroadcast is further in response to determining that the number of conflicts for the particular show is greater than a predetermined threshold.

8. The IHS of claim 7, wherein the conflict information includes open time slot information such that the CA IHS receives open time slot information from those DVR IHSs exhibiting a conflict with respect to the particular show.

9. The IHS of claim 7, wherein the conflict analysis engine is further configured to transmit rebroadcast information to a DVR IHS experiencing a conflict for the particular show, the rebroadcast information indicating when the particular show for which there was a conflict will be rebroadcast.

10. The IHS of claim 8, wherein the conflict analysis engine is further configured to determine a time to rebroadcast the particular show that is related to the open time slot information received from the plurality of DVR IHSs.

11. The IHS of claim 7, wherein the conflict information includes a conflictee show identifier that identifies the particular show that is in conflict with another show in a DVR IHS, the another show being a conflictor show.

12. The IHS of claim 8, wherein the open time slot information indicates time slots when a particular DVR IHS is not programmed to record a show and wherein the time slot is historically not in use for viewing a program by a user of the DVR IHS.

13. A conflict analysis computer program product, comprising:
a non-transitory computer readable storage medium;
first instructions that receive conflict information from a plurality of digital video recorder (DVR) IHSs, the conflict information indicating that a particular show is in conflict with another show; and
second instructions that generate a recommendation to rebroadcast the particular show in response to the conflict information received from the plurality of DVR IHSs, wherein the recommendation to rebroadcast is further in response to determining that the number of conflicts for the particular show is greater than a predetermined threshold,
wherein the first and second instructions are stored on the non-transitory computer readable storage medium.

14. The conflict analysis computer program product of claim 13, wherein the conflict information includes open time slot information such that the conflict analysis computer program product receives open time slot information from those DVR IHSs exhibiting a conflict with respect to the particular show.

15. The conflict analysis computer program product of claim 13, further comprising third instructions that transmit rebroadcast information to a DVR IHS experiencing a conflict for the particular show, the rebroadcast information indicating when the particular show for which there was a conflict will be rebroadcast.

16. The conflict analysis computer program product of claim 14, further comprising fourth instructions that determine a time to rebroadcast the particular show that is related to the open time slot information received from the plurality of DVR IHSs.

17. The conflict analysis computer program product of claim 13, wherein the conflict information includes a conflictee show identifier that identifies the particular show that is in conflict with another show in a DVR IHS, the another show being a conflictor show.

\* \* \* \* \*